United States Patent
Shamsi et al.

(10) Patent No.: US 11,450,130 B2
(45) Date of Patent: Sep. 20, 2022

(54) ANIMAL IDENTIFICATION BASED ON UNIQUE NOSE PATTERNS

(71) Applicant: Pal Universe, Inc., Los Angeles, CA (US)

(72) Inventors: Mohammad Mehdi Mollanouri Shamsi, Los Angeles, CA (US); Anthony David Tribelli, Newport Beach, CA (US)

(73) Assignee: Pal Universe, Inc., Los Angeles, CA (US)

( * ) Notice: Subject to any disclaimer, the term of this patent is extended or adjusted under 35 U.S.C. 154(b) by 107 days.

(21) Appl. No.: 16/998,249

(22) Filed: Aug. 20, 2020

(65) Prior Publication Data

US 2021/0089763 A1    Mar. 25, 2021

Related U.S. Application Data

(60) Provisional application No. 62/905,876, filed on Sep. 25, 2019.

(51) Int. Cl.

| | |
|---|---|
| *G06V 40/10* | (2022.01) |
| *G06F 16/535* | (2019.01) |
| *G06K 9/62* | (2022.01) |
| *A01K 11/00* | (2006.01) |
| *G06T 7/13* | (2017.01) |
| *G06F 16/55* | (2019.01) |
| *G06T 7/12* | (2017.01) |
| *G06V 10/75* | (2022.01) |

(52) U.S. Cl.
CPC ............ *G06V 40/10* (2022.01); *A01K 11/006* (2013.01); *G06F 16/535* (2019.01); *G06F 16/55* (2019.01); *G06K 9/6232* (2013.01); *G06T 7/12* (2017.01); *G06T 7/13* (2017.01); *G06V 10/751* (2022.01)

(58) Field of Classification Search
None
See application file for complete search history.

(56) References Cited

U.S. PATENT DOCUMENTS

| | | |
|---|---|---|
| 6,424,727 B1 | 7/2002 | Musgrave et al. |
| 6,845,382 B2 | 1/2005 | Meadows |
| 9,323,783 B1 | 4/2016 | Mowry |
| 2016/0095292 A1 | 4/2016 | Hosseini |

(Continued)

OTHER PUBLICATIONS

Kumar, S.—"Cattle Recognition: A New Frontier in Visual Animal Biometrics Research"—ResearchGate—May 2019, pp. 1-21 (Year: 2019).*

(Continued)

*Primary Examiner* — Bernard Krasnic
(74) *Attorney, Agent, or Firm* — Stetina Brunda Garred and Brucker

(57) ABSTRACT

A method of identifying an animal may include obtaining a digital image of at least a portion of the animal's nose, identifying a reference point in the digital image from one or more landmarks in the digital image, detecting a plurality of edges in the digital image, the plurality of edges defining a plurality of islands separated by recessed channels, extracting, from the digital image, one or more features characterizing the plurality of islands in relation to the reference point, and comparing the one or more features to a database of extracted features stored in association with known animals.

20 Claims, 12 Drawing Sheets

(56) References Cited

U.S. PATENT DOCUMENTS

2019/0080159 A1 3/2019 Wee et al.
2019/0297252 A1* 9/2019 Choi ................ H04N 5/232127

OTHER PUBLICATIONS

Fan, H.—"Using Edge SIFT Points for Simple Shape Object Matching"—ICMT 2013, pp. 540-547 (Year: 2013).*
Singh, S.—"Muzzle point pattern based techniques for individual cattle identification"—IET 2017, pp. 805-814 (Year: 2017).*
Chandrakar, S.—"Muzzle point pattern recognition system using image pre-processing techniques" ResearchGate—Dec. 2017, pp. 127-132 (Year: 2017).*

* cited by examiner

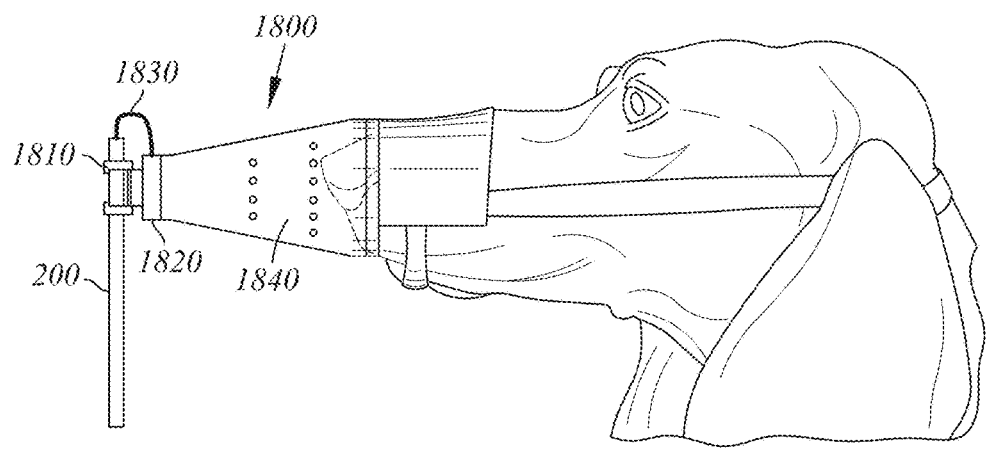
*Fig. 18*
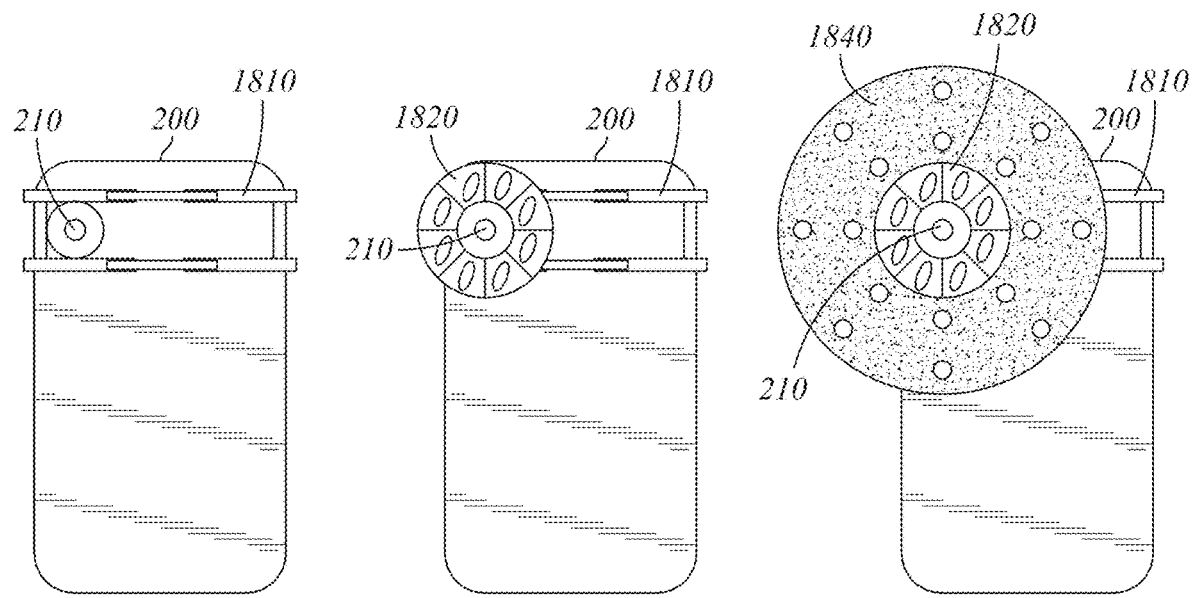
*Fig. 19A*   *Fig. 19B*   *Fig. 19C*

ANIMAL IDENTIFICATION BASED ON UNIQUE NOSE PATTERNS

CROSS-REFERENCE TO RELATED APPLICATIONS

This application relates to and claims the benefit of U.S. Provisional Application No. 62/905,876, filed Sep. 25, 2019, the entire contents of which is expressly incorporated herein by reference.

STATEMENT RE: FEDERALLY SPONSORED RESEARCH/DEVELOPMENT

Not Applicable

BACKGROUND

1. Technical Field

The present disclosure relates to animal identification and, more particularly, to identifying an animal using nose patterns in a captured image of the animal's nose.

2. Related Art

Animal identification is important in different aspects like proof of ownership, animal theft prevention, animal disease transmission, finding lost pets and even protecting endangered animals. Conventional methods utilize tags and tattoos. Another popular method, mostly with pets, is the microchip. A microchip, which is a small chip that contains animal and owner information, is injected inside the body of animals. In this method a scanner is needed to access the chip to show the registered information. Other methods are animal iris (see, e.g., U.S. Pat. No. 6,424,727) and retina imaging as well as DNA. One promising method is biometric identification of animals based on nose patterns present in some animals such as dogs, cows, and deer. It has been proven that no two animals' nose patterns are the same.

Among those patents relating to the use of animal nose patterns for identification are U.S. Pat. Nos. 6,845,382, 9,323,783, U.S. Patent Application Pub. No. 2016/0095292, and U.S. Patent Application Pub. No. 2019/0080159. Thus far, such efforts have done little to address the difficulties associated with comparing such complex patterns on a large scale, such as for the purposes of providing a city-wide, state-wide, or national matching database. In addition to processing speed, memory, and data storage requirements, such difficulties may include challenges arising from the need to compare images captured by different devices at potentially different resolutions, distances, and positions relative to the animal's nose.

BRIEF SUMMARY

The present disclosure contemplates various systems, methods, and apparatuses for overcoming the above drawbacks accompanying the related art. One aspect of the embodiments of the present disclosure is a method of identifying an animal. The method may comprise obtaining a digital image of at least a portion of the animal's nose, identifying a reference point in the digital image from one or more landmarks in the digital image, detecting a plurality of edges in the digital image, the plurality of edges defining a plurality of islands separated by recessed channels, extracting, from the digital image, one or more features characterizing the plurality of islands in relation to the reference point, and comparing the one or more features to a database of extracted features stored in association with known animals.

The one or more features may include a size distribution of the plurality of islands. The size distribution may comprise a distribution of sizes of inscribed or circumscribed circles of the plurality of islands.

The one or more features may include a map of inscribed or circumscribed circles of the plurality of islands.

The one or more features may include a map of the channels, which may include their intersections and the number of connections at each intersection, for example.

The one or more features may include a chain code characterizing a perimeter of one or more of the plurality of islands. The method may comprise applying a mask to the digital image based on the chain code, wherein the one or more features includes at least one feature extracted from the digital image with the mask applied thereto.

The one or more features may include a polygon approximating one or more of the plurality of islands.

The one or more features may include an angularity, circularity, or shape matrix of one or more of the plurality of islands.

The one or more landmarks may include a nostril or a philtrum of the animal's nose.

The one or more landmarks may include an eye of the animal.

The one or more landmarks may include a collection of the islands.

The obtaining of the digital image may include selecting an image from a sequence of captured video frames.

Another aspect of the embodiments of the present disclosure is a non-transitory computer readable medium on which are stored instructions executable by a processor or programmable circuit to perform operations for identifying an animal. The operations may comprise obtaining a digital image of at least a portion of the animal's nose, identifying a reference point in the digital image from one or more landmarks in the digital image, detecting a plurality of edges in the digital image, the plurality of edges defining a plurality of islands separated by recessed channels, extracting, from the digital image, one or more features characterizing the plurality of islands in relation to the reference point, and comparing the one or more features to a database of extracted features stored in association with known animals.

Another aspect of the embodiments of the present disclosure is a system for identifying an animal. The system may comprise a camera for capturing a digital image of at least a portion of the animal's nose and one or more processors collectively operable to identify a reference point in the digital image from one or more landmarks in the digital image, detect a plurality of edges in the digital image, the plurality of edges defining a plurality of islands separated by recessed channels, and extract, from the digital image, one or more features characterizing the plurality of islands in relation to the reference point. The system may comprise a database of extracted features stored in association with known animals, and the one or more processors may be collectively operable to compare the one or more features to the database to identify the animal.

The system may comprise a mobile device including the camera. The one or more processors may include a processor of the mobile device that is operable to display an overlay on a display of the mobile device while the digital image is being captured by the camera, the overlay including one or more indicators for aligning the camera with the animal's nose. The one or more processors may include a processor of the mobile device that is operable to select the digital image from a sequence of video frames captured by the camera. The system may comprise a server in communication (e.g. wireless communication) with the mobile device. The one or more processors may include a processor of the server that compares the one or more features to the database to identify the animal.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 18 shows a side view of an example image acquisition device that may be used with the animal identifying apparatus;

FIG. 19A shows a front view of a hanger of the image acquisition device;

FIG. 19B shows a front view of the hanger and a light disc of the image acquisition device; and FIG. 19C shows a front view of the assembled image acquisition device including the hanger, the light disc, and a cone thereof.

DETAILED DESCRIPTION

The present disclosure encompasses various embodiments of systems, methods, and apparatuses for identifying an animal based on the animal's unique nose patterns. The detailed description set forth below in connection with the appended drawings is intended as a description of several currently contemplated embodiments and is not intended to represent the only form in which the disclosed invention may be developed or utilized. The description sets forth the functions and features in connection with the illustrated embodiments. It is to be understood, however, that the same or equivalent functions may be accomplished by different embodiments that are also intended to be encompassed within the scope of the present disclosure. It is further understood that the use of relational terms such as first and second and the like are used solely to distinguish one from another entity without necessarily requiring or implying any actual such relationship or order between such entities.

Figure 1:
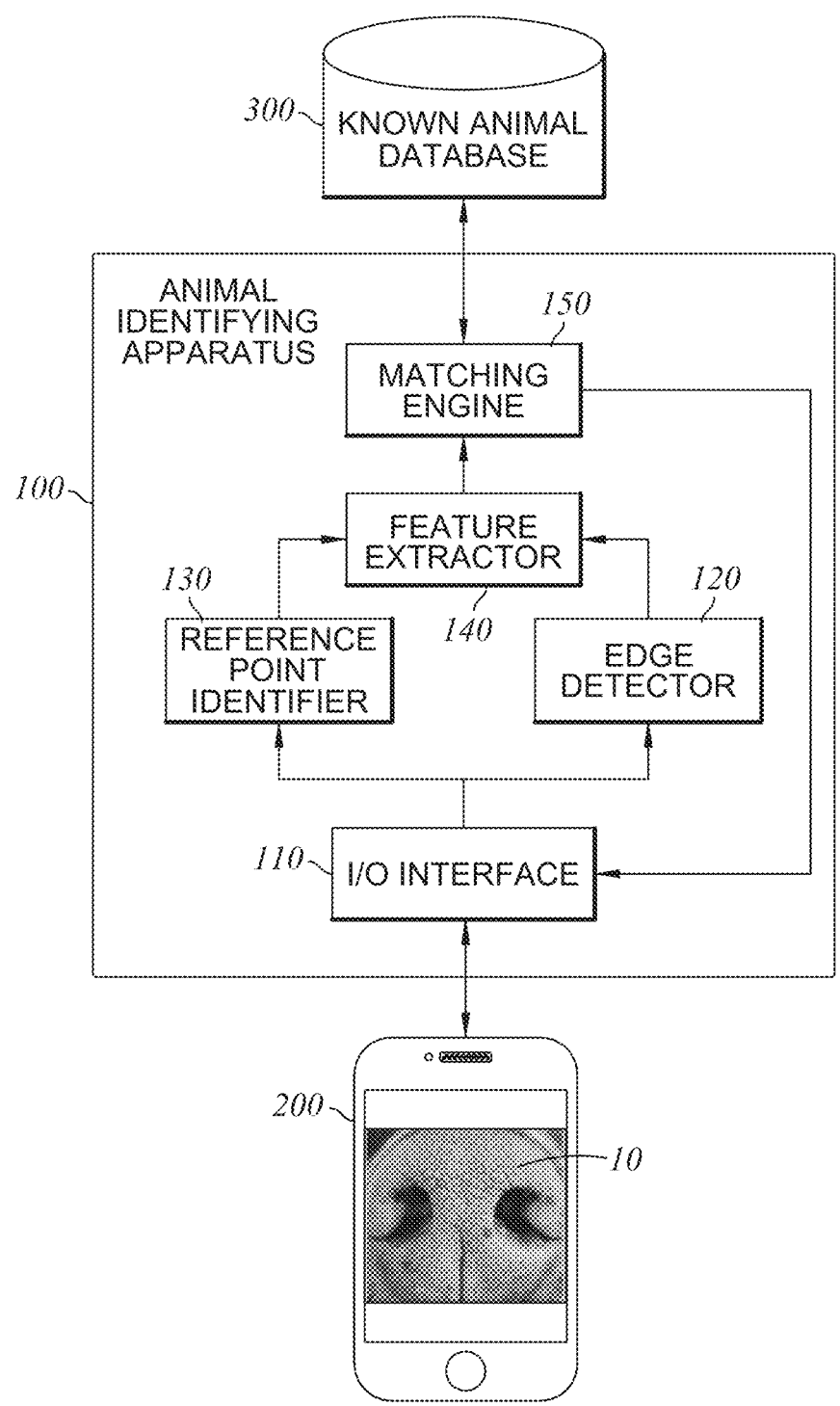
FIG. 1 shows an example animal identifying apparatus according to an embodiment of the present disclosure.

FIG. 1 shows an example animal identifying apparatus 100 according to an embodiment of the present disclosure. The animal identifying apparatus 100 may comprise one or more processors, some or all of which may be included in a mobile device 200 such as a smart phone, tablet, or personal computer and some or all of which may be included in a server or combination of networked servers remote from the mobile device 200. The animal identifying apparatus 100 may communicate with a web browser or mobile application of the mobile device 200 to obtain a digital image 10 of at least a portion of an animal's nose that has a pebbled surface made up of islands separated by recessed channels. The animal identifying apparatus 100 may extract features characterizing the islands in relation to one or more reference points identified in the digital image 10. The extracted features may then be compared to a known animal database 300 in order to identify the animal. Unlike conventional methods that rely on image-to-image matching and become infeasible on a large scale, the feature-based analysis performed by the animal identifying apparatus 100 represents a novel computer vision approach that leverages the well-defined island pattern found on animals' noses for improved efficiency and scalability.

Figure 2:
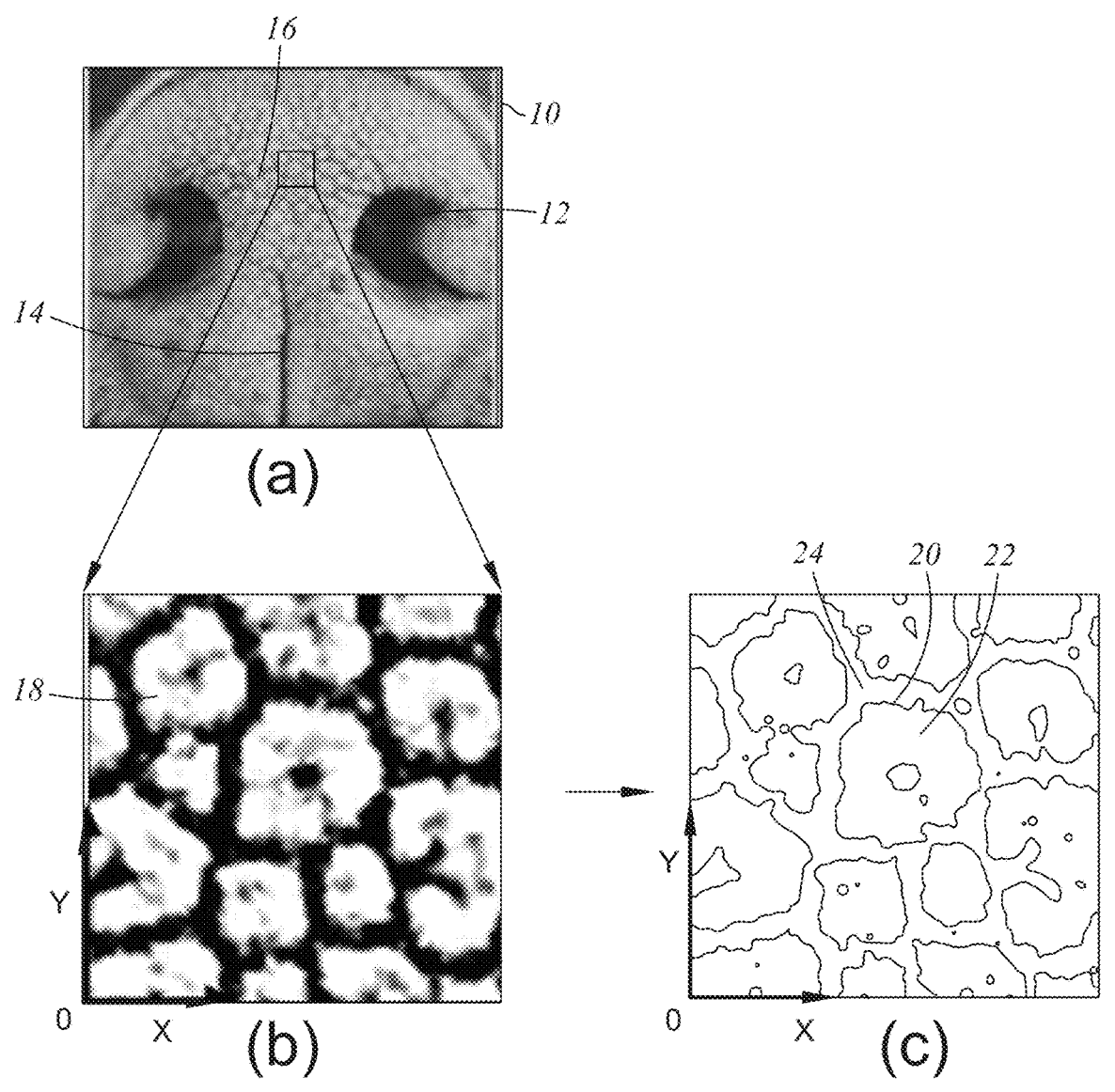
FIG. 2 shows an image of a dog's nose, a close-up image thereof, and an example output of an edge detection process performed thereon.

Referring briefly to the enlarged image of the animal's nose identified as image (a) in FIG. 2, the different parts of a dog's nose may be seen. The furless skin surface of a dog's nose is called the rhinarium 16 or planum nasal and is characterized by a pebbled surface 18 as shown in image (b) that is made up of islands separated by recessed channels. The exact topography of this pebbled surface 18 varies between one dog and another in a way analogous to human fingerprints. Besides dogs, other animals including cows, deer, cats, and raccoons share this unique structure on their noses. In addition, the nose of a dog has two comma-shaped openings called nostrils 12, which help the dog breathe in air and analyze smells, as well as a midline groove called a philtrum 14 that extends from the nose down to the dog's upper lip and carries moisture from the mouth to the rhinarium 16.

Referring back to FIG. 1, the animal identifying apparatus 100 may include an input/output (I/O) interface 110, an edge detector 120, a reference point identifier 130, a feature extractor 140, and a matching engine 150. The I/O interface 110 may receive data from and transmit data to a web browser or mobile application of the mobile device 200. In addition to the exchange of data associated with presenting a user interface to the user of the mobile device, the I/O interface 100 may, in particular, obtain the digital image 10. In this regard, a user wishing to identify or register a dog, for example, may take a picture of the dog's nose using a camera of the mobile device 200. In some cases, the user may access the camera within a mobile application associated with the animal identifying apparatus 100 (e.g. a mobile app available for download on an app store or other distribution platform), while in other cases a native camera application of the mobile device 200 may be used. If the animal identifying apparatus 100 is wholly embodied in one or more remote servers, the I/O interface 110 may obtain the captured digital image 10 via upload from the mobile device 200 (e.g. using a mobile application or a web browser). On the other hand, if at least part of the processing performed by the animal identifying apparatus 100 is local to the mobile device 200, then the I/O interface 110 may obtain the digital image 10 locally from a storage medium of the mobile device 200.

Output of the I/O interface 110 may include communication with a web browser or mobile application of the mobile device 200 to transmit, display, or otherwise present information to the user of the mobile device 200, such as a matching result indicating the probable identity of an unknown dog in the captured digital image 10 or a barcode or other registration information corresponding to a newly registered dog. The output of the I/O interface 110 may also include feedback to assist the user with capturing the digital image 10 as described in more detail below.

The edge detector 120 may detect a plurality of edges in the digital image 10 (e.g., where the image brightness changes sharply or has discontinuities). Referring again to FIG. 2, the closeup image identified as image (b) shows the pebbled surface 18 in one area of the dog's nose. The edge detector 120 may execute any of various edge detection algorithms such as Canny edge detection, Sobel operators, Least-Squares Line Fitting (LSLF), fractional differential gradient, fractional integration, etc. to detect a plurality of edges 20 defining a plurality of islands 22 separated by recessed channels 24 as shown in image (c). The channels 24 are thin linear areas of a lower elevation, and the islands 22 are higher elevation areas surrounded by the channels 24. By leveraging this distinctive characteristic of the nose pattern, the edge detector 120 can more easily and efficiently generate the plurality of edges 20. As an example, by considering the pebbled surface 18 of a dog's nose, the edge detector 120 can apply a fractional integration method to detect the recessed channels 24 and islands 22 clearly. According to this method, non-textured pixel positions and speckle noise may be detected by utilizing information of neighboring pixels in the image and the contour and direction distribution of various noise anomalies in the spatial domain.

Before, after, or as part of the process of detecting the plurality of edges 20, the edge detector 120 may apply various image processing methods to the digital image 10. For example, the digital image 10 may be preprocessed to prepare the image for feature detection, extraction and correspondence by applying different methods such as scale adjustment, noise removal, and segmentation (e.g. partitioning the image into a region that appears to contain a nose with texture information). In the process of digital image acquisition, some isolated pixel points with random positions and values may appear in the image as image noise. Additionally, unwanted artifacts may appear, for example reflections from eyes and wet noses, grass or food, shadows and other things that affect the quality of the image 10 and may obscure important feature information. Image denoising may be applied to reduce such speckle noise while maintaining the details of the image edges and texture.

Figure 3:
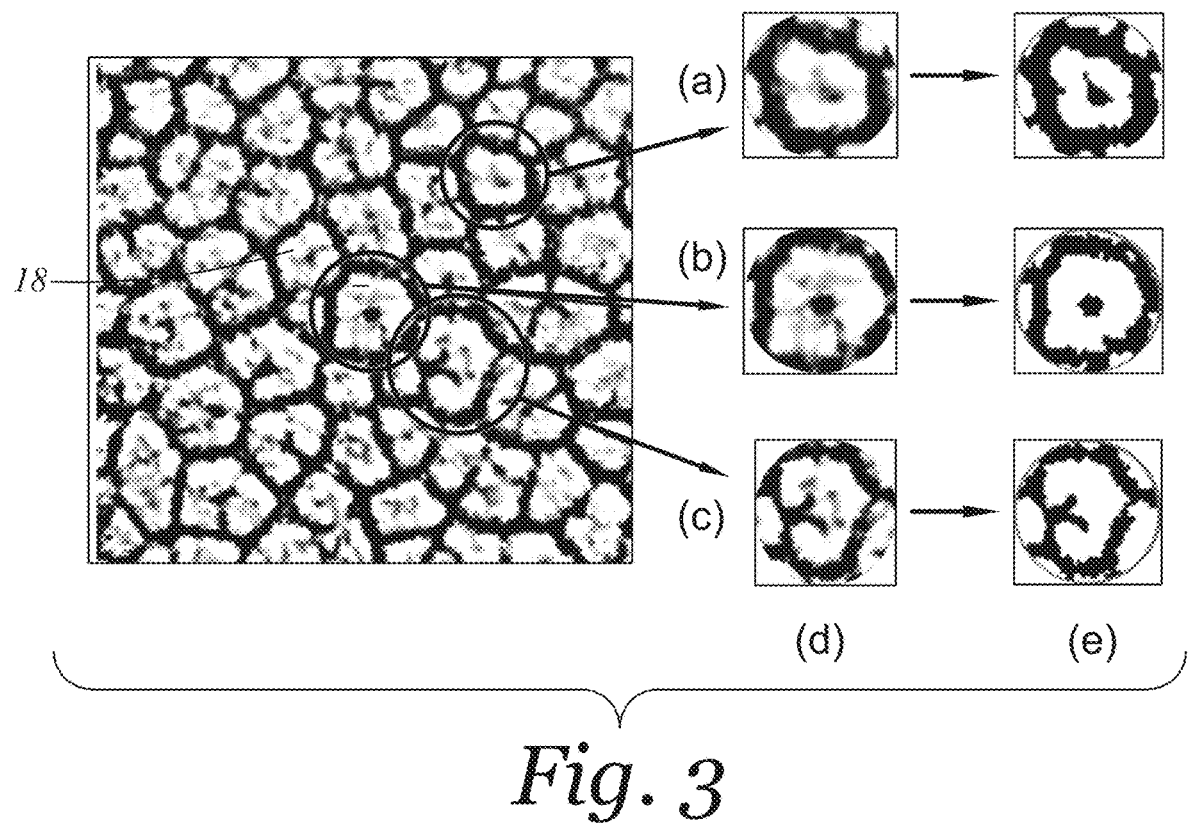
FIG. 3 shows a close-up image of a dog's nose and example image processing thereof.

Referring to FIG. 3, the digital image 10 (shown at a lesser magnification than in FIG. 2) may exhibit different irregular shapes and scenarios in the pebbled surface 18 of the dog's nose, such as interior bumps as shown in images (a) and (b) that create "land-locked" recesses within an island 22 and/or free channels as shown in image (c), i.e., "dead-end" recesses that penetrate from the network of channels 24 partially into an island 22. In order to accurately reflect such irregularities when detecting the plurality of edges 20 so as to meaningfully classify the pebbled surface 18 for feature extraction, the edge detector 120 may, for example, extract the relevant portions of the digital image as shown in column (d) and apply a denoising method to remove unwanted texture as shown in column (e). In this way, the resulting edge detection may ignore minor contours in the pebbled surface 18 of the nose that might not be permanent structures and might depend on lighting, etc.

Referring back to FIG. 1, the reference point identifier 130 of the animal identifying apparatus 100 may identify one or more reference points in the digital image 10 from one or more landmarks in the digital image 10. In general, the present disclosure contemplates a variety of features that may be extracted from the digital image 10 and used for characterizing an animal's nose. A reference point in the digital image 10 may be used to unambiguously define such features in a normalized coordinate system, irrespective of the exact composition of the digital image 10 in relation to the animal's nose. For example, if a set of features is stored based on a digital image 10 captured of an animal at the time of registration, and later a new digital image 10 is used to identify the same animal, the portion of the animal's nose that appears in the two digital images may differ. By defining features in relation to a reference point that is common to both digital images, a meaningful comparison can be made between the extracted features of the two digital images.

Figure 4:
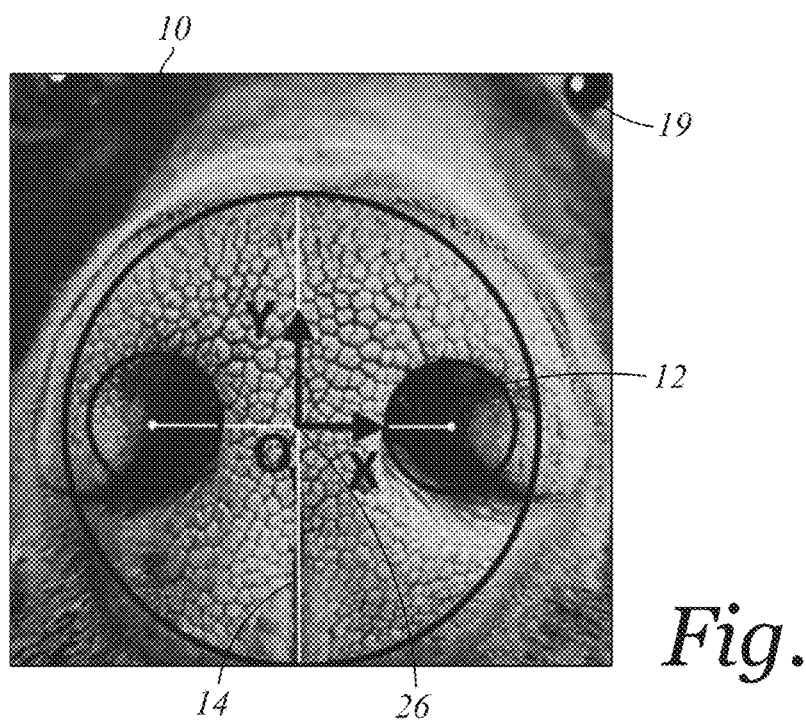
FIG. 4 shows an image of a dog's nose illustrating the identification of a reference point.

Referring briefly to FIG. 4, the identification of a reference point 26 is shown in the case of an example digital image 10 of a dog's nose. In order to illustrate the various landmarks that may be used to identify the reference point 26, the digital image 10 of FIG. 4 shows a slightly expanded view that includes the dog's eyes 19 in addition to the dog's nostrils 12 and philtrum 14. It is contemplated that the reference point identifier 130 may use one or more landmarks such as nostril(s) 12, philtrum 14, and/or eye(s) 19 to establish the reference point 26 and may establish more than one such reference point 26. In the example illustrated in FIG. 4, the reference point identifier 130 has identified an origin O of a cartesian coordinate system as the reference point 26, with the origin O aligned with the philtrum 14 and halfway between the two nostrils 12 (indicated by the smaller left and right circles). The smaller right and left circles indicate the location of nostrils. The large circle may approximate the area of the pebbled surface 18 and may be centered at the origin O and defined relative to the origin O and the nostrils 12 (e.g., based on the relationship between the size of the smaller circles and the distance between the smaller circles and the origin O). The large circle may be another example of a reference point 26. The distance between landmarks can be used to normalize a coordinate system to remove variables such as camera resolution. Similarly, positions of landmarks can be used to remove variables such as rotation (which way points "down"), for example, with the nostrils 12 showing the horizontal axis and the philtrum 14 showing the vertical axis. It is contemplated that the locations, sizes, and shapes of the nostrils 12 and other elements of the image 10 may depend on the animal type and breed. The reference point identifier 130 may, for example, detect nostril locations, possibly with the help of animal type and breed information, and determine two circular or ellipsoid regions representing the nostrils 12.

Referring back to FIG. 1, it can be seen that the reference point identification may be performed simultaneously with, before, or after the edge detection, as depicted by the parallel arrangement of the reference point identifier 130 and edge detector 120 of the animal identifying apparatus 100. However, it is noted that one or more landmarks 12, 14, 19 may be found using the plurality of detected edges 20 rather than by processing the original image 10 (e.g., using machine learning based recognition of nostrils 12, philtrum 15, eyes 19, etc.). In this case, the reference point identification may occur after the edge detection, with the reference point identifier 130 receiving an output of the edge detector 120 as input. In some cases, a collection of the islands 22 defined by the edges 20 may itself serve as a reference point 26. For example, a sufficiently unique group of neighboring islands 22 may be easily distinguishable enough to serve as the reference point 26 (e.g. by having features that are unique compared to all other combinations of neighbors). This may be especially useful in a case where the image 10 is only a partial view of the animal's nose and it is difficult to locate nostrils 12 and other landmarks.

With the plurality of edges 20 having been detected by the edge detector 120 and one or more reference points 26 having been identified by the reference point identifier 130, the animal identifying apparatus 100 may proceed with feature extraction. In particular, the feature extractor 140 may extract, from the digital image 10, one or more features characterizing the plurality of islands 22 in relation to the reference point(s) 26. Various features may be extracted, including but not limited to bitmaps, chain codes, fitted circles, polygons, etc. There are several methods that may be used to extract the features, which may depend on the animal type. As an example, a gradient-based operator may be used that uses the Laplacian to take the second derivative of the nose pattern of the animal. Specific examples of features are described below in relation to FIGS. 5 through 13. By characterizing the islands 22 that make up the unique pebbled surface 18 of the animal's nose, the features may be thought of as representing a fingerprint or signature of the animal, separate and distinct from any particular captured image 10. Such extracted features may, for example, be scale and resolution invariant, allowing for accurate identification of an animal based on two very different images 10 taken with different devices 200. In addition, extracted features may require less memory and data storage than the digital image 10 itself, and their comparison may entail the use of fewer processing resources than a direct image-to-image comparison, allowing for increased speed and efficiency.

The matching engine 150 may compare the one or more features extracted by the feature extractor 140 to the known animal database 300. For example, the known animal database 300 may be a database of extracted features stored in association with known animals, and a match may be found when the compared features are the same or similar as defined by a predetermined similarity threshold. In an example embodiment in which the animal identifying apparatus 100 is used for pet identification, the known animals and their associated features may be compiled as pet owners register their pets with the animal identifying apparatus 100. The pet owner may take a digital image 10 of her pet and provide contact information and/or other identifying information to be associated with the pet. Just like in the case of identifying an unknown animal, the edge detector 120 may detect edges 20 in the digital image 10, the reference point identifier 130 may identify one or more reference points 26, and the feature extractor 140 may extract one or more features. The feature(s) extracted by the feature extractor 140 may then be stored in the known animal database 300 in association with the information provided by the pet owner. Thus, by registering her pet, a pet owner may later take advantage of the animal identifying apparatus 100 should her pet ever become lost. When a person finds a pet that is registered with the known animal database 300 and captures a digital image 10 of the pet's nose, the feature extractor 140 may extract one or more features that are identical to or similar to those already associated with a pet in the known animal database 300, allowing the matching engine 150 to find a match with high confidence.

Figure 5:
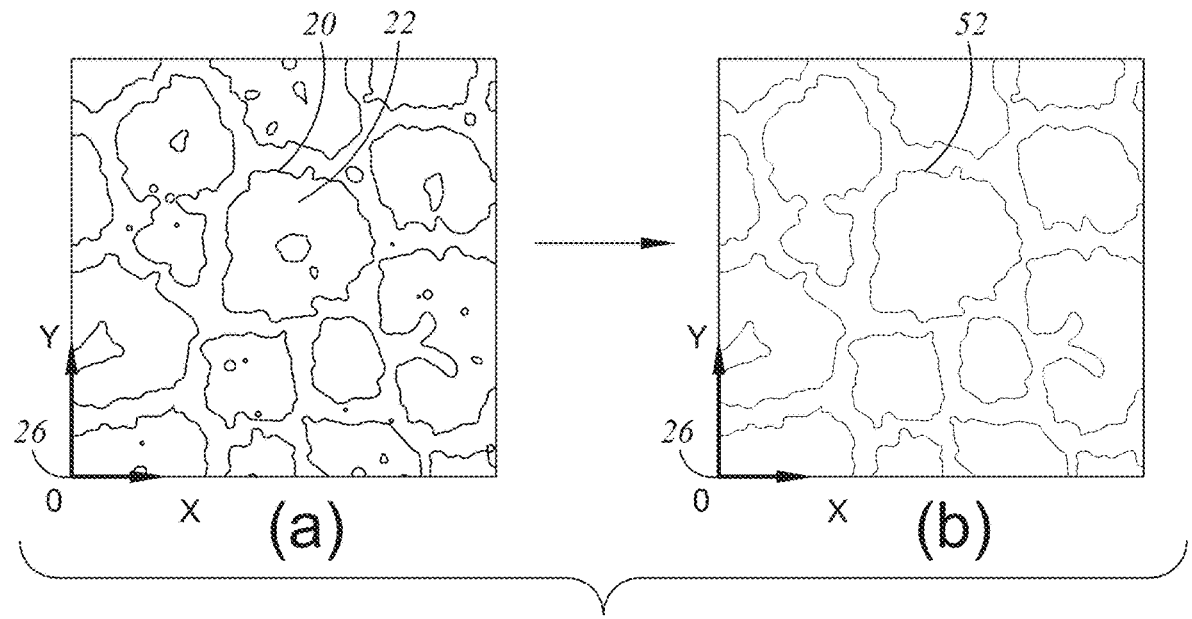
FIG. 5 shows an example of feature extraction based on a digital image of a dog's nose.

FIG. 5 shows an example of feature extraction that may be performed by the feature extractor 140 of the animal identifying apparatus 100 based on a digital image 10 of a dog's nose. In the example of FIG. 5, a chain code or other edgel encoding scheme has been performed on the detected edges 20 shown in image (a) to describe the perimeter 52 of each island 22 to pixel accuracy as shown in image (b). For example, an 8-way associative scheme may be used that encodes each edgel as a vertical, horizontal, or diagonal direction relative to the next. Such an encoding of the perimeter 52 does not depend on the position or orientation of the island 22 on the dog's nose, allowing it to characterize the shape accurately regardless of how the digital image 10 was captured.

As can be seen in FIG. 5, by tracing the perimeter 52 of each island 22 the interior features may be lost. In cases where more accuracy is needed (e.g., for a larger database 300 or for animals whose noses exhibit a more regular pebbled surface 18), the perimeter 52 may be used to create a mask to examine the interior pixels or edgels. For example, the feature extractor 140 may first extract a chain code characterizing a perimeter 52 of one or more of the islands 22. The feature extractor 140 may then apply a mask to the digital image 10 based on the extracted chain code and extract one or more further features (e.g., chain codes or other features described herein) from the digital image 10 with the mask applied thereto.

Figure 6:
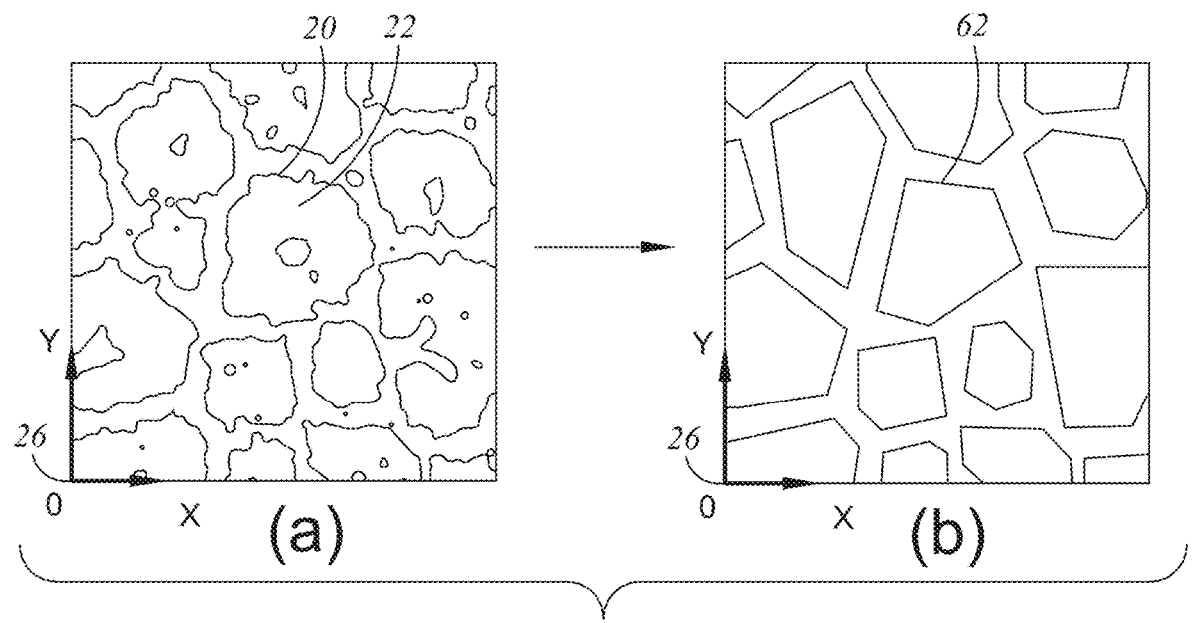
FIG. 6 shows another example of feature extraction based on the digital image.

FIG. 6 shows another example of feature extraction that may be performed by the feature extractor 140 of the animal identifying apparatus 100. Whereas the encoding schemes of FIG. 5 describe the perimeter 52 of each island 22 with pixel accuracy, with the extracted feature being a chain code for example, FIG. 6 illustrates a mere approximation of the perimeter 52 of each island 22 in the form of a fitted polygon 62. For example, the feature extractor 140 may perform a polygon approximation of the islands 22 defined by the plurality of detected edges 20 shown in image (a) to extract one or more features including a polygon 62 approximating one or more of the plurality of islands 22 as shown in image (b). By increasing the number of line segments of each polygon 62, the approximations can be improved to a desired precision.

Figure 7:
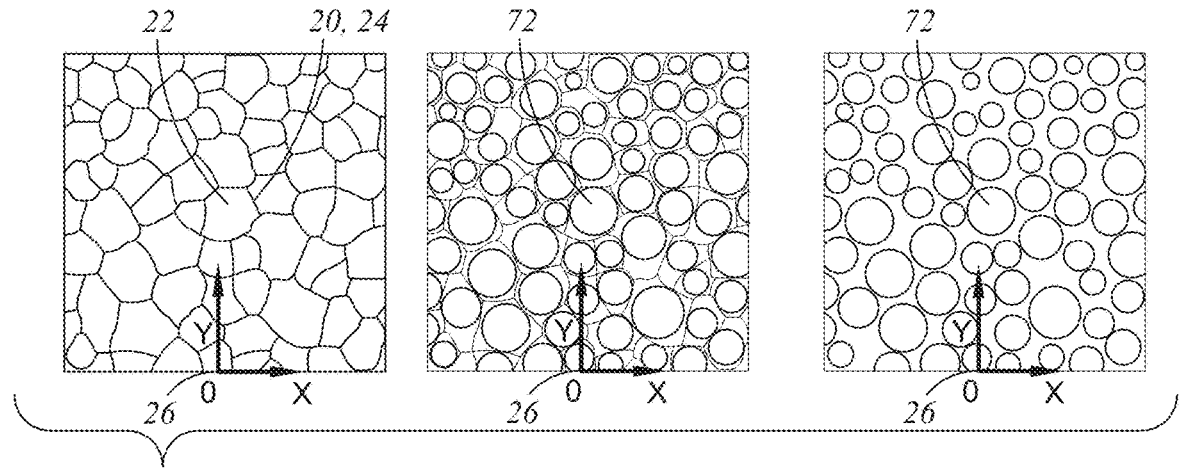
FIG. 7 shows another example of feature extraction based on the digital image.

FIG. 7 shows another example of feature extraction that may be performed by the feature extractor 140 of the animal identifying apparatus 100. In the example of FIG. 7, the one or more extracted features includes a map of inscribed or circumscribed circles 72 of the plurality of islands 22 (depicted as inscribed circles in FIG. 7). In the left-most image, the detected edges 20 defining the plurality of islands 22 are shown, with the surrounding channels 24 being substantially coextensive with the edges 20 at this magnification. (In fact, the edges 20 may border the channels 24 as shown in image (c) of FIG. 2). In the center image, a circle 72 is inscribed in each of the islands 22, with the right-most image showing the resulting map of circles 72. While the information of the original shapes of the islands 22 is lost in this feature, the positions and relative sizes of the islands 22 (and in some cases absolute sizes if the scale is known) are maintained. In particular, the positions of the circles 72 may be defined in relation to a reference point 26 such as the origin O as shown. The map of circles 72 may, for example, be a matrix of values representing the size of each circle 72 indexed by cartesian coordinates relative to the reference point 26 (e.g., x and y values as rows and columns). As another example, the map of circles 72 may be a set of vectors or ordered triplets defining two position coordinates and a size value. As another example, such vectors or other data structures may define all surrounding circles 72 for a given circle 72 of the map.

As explained above in relation to FIG. 7, a map of inscribed or circumscribed circles 72 may be defined in relation to the reference point 26 identified by the reference point identifier 130. That is, the locations of each circle 72 may be characterized relative to the position of the reference point 26. While this is also possible in the examples of FIGS. 5 and 6, with each encoded perimeter 52 and polygon approximation 62 having a defined position relative to the reference point 26, these features need not be defined so precisely. For example, when encoding or approximating the perimeters of islands 22 as in FIGS. 5 and 6, the feature extractor 140 may simply define a region of the digital image 10 relative to the reference point 26, such as the nearest p islands 22 to the reference point 26, with p being some predetermined number. The encoded perimeters 52 or polygon approximations 62 characterizing the islands 22 within such region may then be extracted as described.

Figure 8:
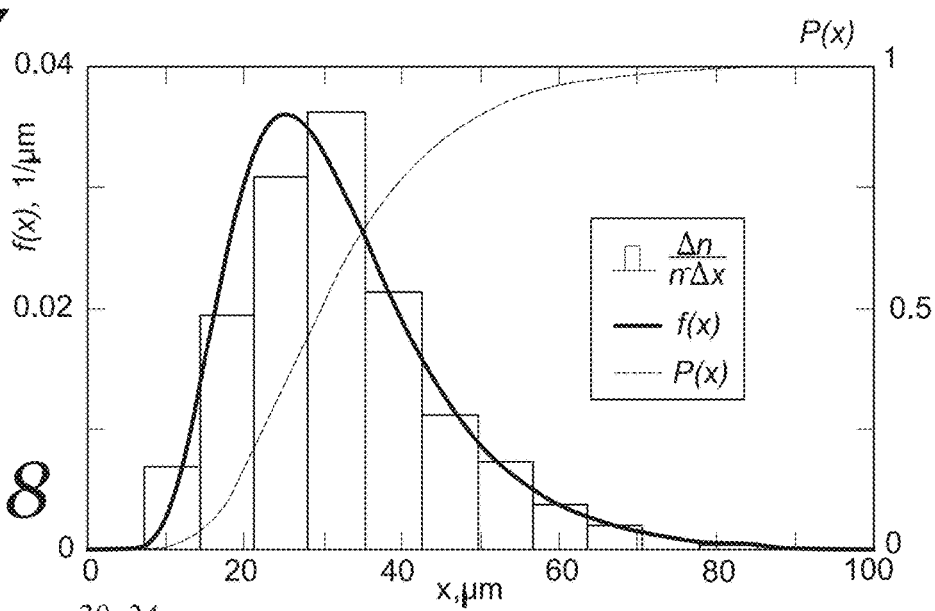
FIG. 8 shows another example of feature extraction based on the digital image.

FIG. 8 shows another example of feature extraction that may be performed by the feature extractor 140 of the animal identifying apparatus 100. In the example of FIG. 8, the one or more extracted features includes a size distribution of the plurality of islands 22. The size distribution may be a histogram of the sizes of the inscribed or circumscribed circles 72 described above (with the size being any measure of size such as radius, diameter, area, circumference, etc.). As described above in relation to FIGS. 5 and 6, the size distribution may be defined within a region of the digital image 10 relative to the reference point 26, for example. Advantageously, such a size distribution may be normalized to represent only the numbers and relative sizes of circles or other shapes in the animal's nose or a region thereof, thus being unaffected by image size and angle. Such a size distribution represents an extracted feature of relatively low precision, as the location information of the map described in relation to FIG. 7 is lost.

Alternatively, the size distribution of FIG. 8 may be a distribution of more precisely calculated sizes of the islands 22, rather than of the sizes of circumscribed or inscribed circles 72. For example, any irregular shape boundary can be defined by the function R(φ) that defines the distance from the central point of the irregular shape to the edges as a function of angle φ (0<φ<2π). R(φ) is defined using Fourier series coefficients as follows:

$$R(\varphi) = a_0 + \sum_{n=1}^{\infty} [a_n \cos(n\varphi) + b_n \sin(n\varphi)] \quad \text{Eq.1}$$

If a Fourier series is applied, the following equations can be used to calculate area (A) and perimeter (P) of any arbitrarily shaped island 22 as follows:

$$A = \frac{1}{2} \int_0^{2\pi} \left| \begin{array}{cc} x(\varphi') - x_0 & y(\varphi') - y_0 \\ x'(\varphi') & y'(\varphi') \end{array} \right| d\varphi' \quad \text{Eq.2}$$

$$P = \int_0^{2\pi} \sqrt{[x'(\varphi')]^2 + [y'(\varphi')]^2}\, d\varphi' \quad \text{Eq.3}$$

We can then define a circle with the same area and mass center as any irregular shape, and each irregular island 22 may be represented by such a circle. In this way, a more precise size distribution of the islands 22 may be derived as shown in FIG. 8, including the histogram of the countable size distribution $$\left( \frac{\Delta n}{n \cdot \Delta x} \right),$$

the size distribution ($f_{(x)}$), and the cumulative size distribution ($p_{(x)}$) (which may determine the proportion of irregular shapes smaller than the upper size, for example), as defined by the following equation in which $\mu = \ln(x_n)$, $x_n$ is a median diameter, and $\sigma$ is a standard deviation of the logarithms of diameters from their mean value:

$$f_{(x)} = \frac{1}{x \cdot \sigma \sqrt{2\pi}} \exp\left( -\frac{(\ln x - \mu)^2}{2\sigma^2} \right) \quad \text{Eq.4}$$

By using the function $f_{(x)}$, it may be possible to estimate the size distribution of irregular shapes when data from some parts of the nose is unavailable, based on the probability or another portion of the animal's nose.

Figure 9:
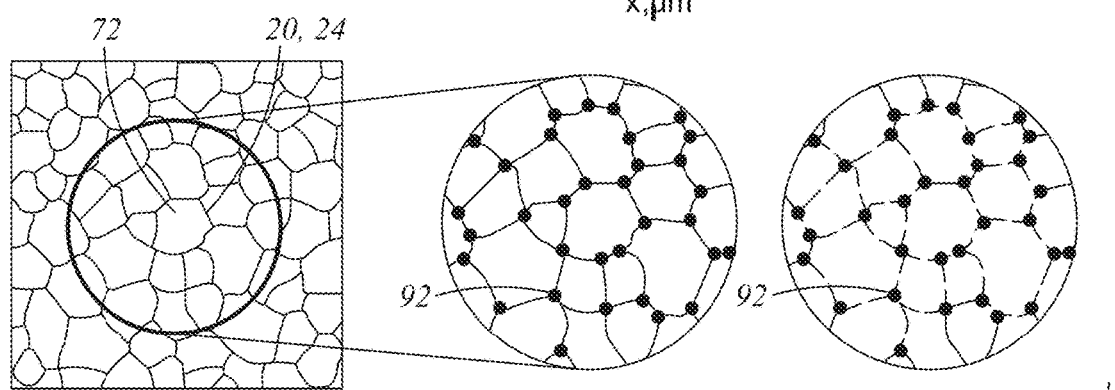
FIG. 9 shows another example of feature extraction based on the digital image.

FIG. 9 shows another example of feature extraction that may be performed by the feature extractor 140 of the animal identifying apparatus 100. In the example of FIG. 9, the one or more extracted features includes a map of the channels 24. In the left-most image, the detected edges 20 defining the plurality of islands 22 are shown. As in FIG. 7, the surrounding channels 24 may be considered substantially coextensive with the edges 20 at this magnification. In the center image, joints 92 are found at each intersection point between channels 24, with the right-most image showing the number of channels 24 meeting at each joint 92. The extracted map of channels 24 may describe the positions of joints and may further describe the number of channels 24 meeting at each joint 92, for example. The extracted map of channels 24 may additionally describe a width variation of channels 24, for example. Like the map of circles 72, the map of channels 24 may be defined relative to an origin O or other reference point 26 (see FIG. 7).

By analyzing each irregularly shaped island 22 defined by the detected edges 20 in the digital image 10, the details of the animal's nose may be extracted and stored in appropriate matrices. As described by way of example in relation to FIGS. 10 through 13, the feature extractor 140 of the disclosed animal identifying apparatus 100 may employ any of various methods to characterize and analyze such irregular shapes in relation to their mass centers, locations, areas, perimeters, etc.

Figure 10:
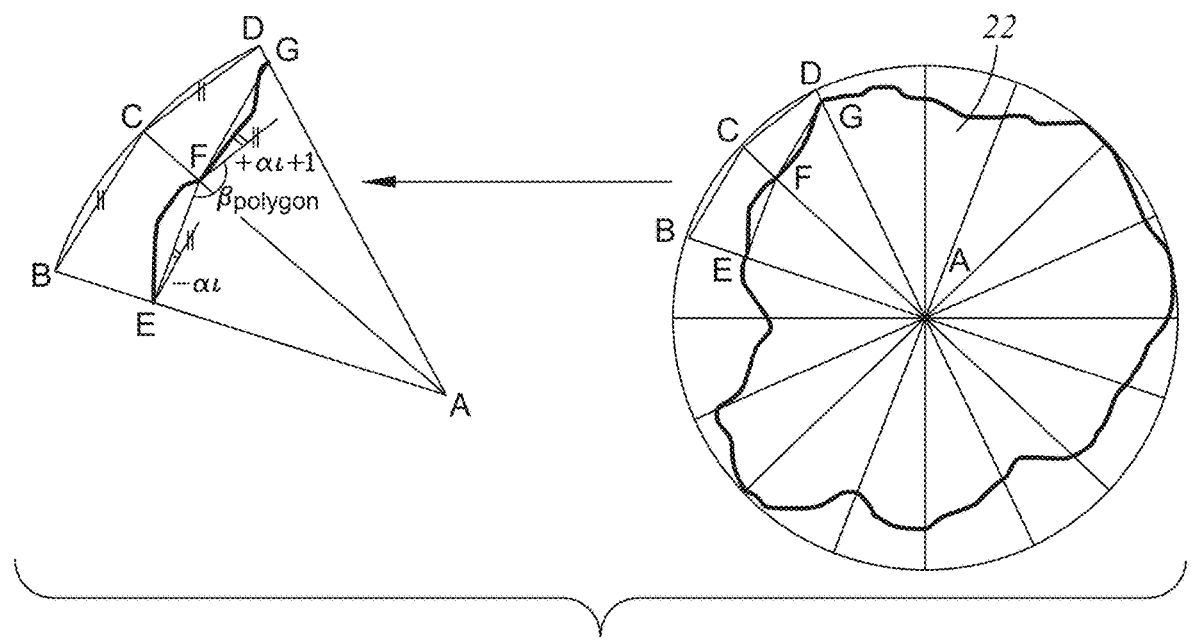
FIG. 10 shows another example of feature extraction based on the digital image.

FIG. 10 shows another example of feature extraction that may be performed by the feature extractor 140 of the animal identifying apparatus 100. In the example of FIG. 10, the one or more extracted features includes a shape factor (SF) of one or more of the plurality of islands 22. In particular, a normalized shape factor (SF) may be calculated according to the following equation, with a defined as shown in FIG. 10:

$$\text{Normalized } SF = \frac{\sum_{i=1}^{N} |\alpha_i(IS)|}{\sum_{i=1}^{N} |\alpha_i(\text{flat } IS)|} = \frac{\sum_{i=1}^{N} |\alpha_i(IS)|}{N \times 45°} \times 100\% \quad \text{Eq.5}$$

Along the same lines, the one or more extracted features may include an angularity of one or more of the plurality of islands 22. The angularity may be quantified as an angularity index (AI), which can be defined in terms of the number and sharpness of the corners according to the following equation again referring to FIG. 10 (with the angularity of any smooth shape theoretically being zero):

$$AI = \sum_{i=1}^{N} (\beta_{i,IS} - 180)^2 - \sum_{i=1}^{N} (\beta_{i,Circle} - 180)^2 \quad \text{Eq.6}$$

Depending on the desired accuracy, different methods can be applied to determine the shape, angularity, and texture of the irregularly shaped islands 22 found on the pebbled surface 18 of an animal's nose. For example, using Fourier analysis, any irregular shape boundary can be defined by Equation 1 for R(φ) as described above.

For n less than 5, Equation 1 describes any irregular shape and for high-frequency harmonics of n bigger than 25 the equation may accurately describe the pebbled surface 18 of an animal's nose. The angularity of the one or more islands 22 may thus be defined by the following equation for a Fourier angularity index (AI) for 5<n<25:

$$AI_F = \sum_{i=5}^{25} \left[ \left(\frac{a_n}{a_0}\right)^2 + \left(\frac{b_n}{a_0}\right)^2 \right] \quad \text{Eq.7}$$

Figure 11:
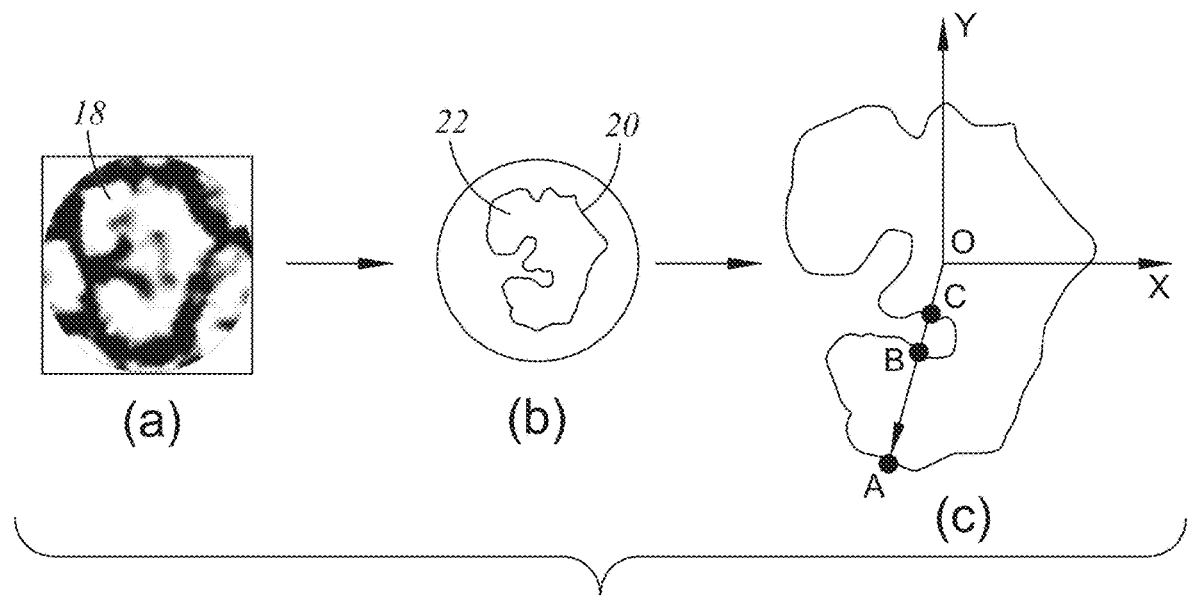
FIG. 11 shows another example of feature extraction based on the digital image.

Even in the case that the irregular shape of an island 22 is a non-star shape, the Fourier series can construct the shape with some modification. Therefore, even if the island 22 has a free channel as shown in FIG. 11, the Fourier method is applicable. In FIG. 11, image (a) shows the portion of the original digital image 10 exhibiting a free channel (i.e., a "dead-end" recess) in the pebbled surface 18 of the animal's nose, image (b) shows the corresponding detected edges 20 defining a non-star shaped island 22, and image (c) shows coordinates relative to a mass center of the island 22 for defining a Fourier series.

Figure 12:
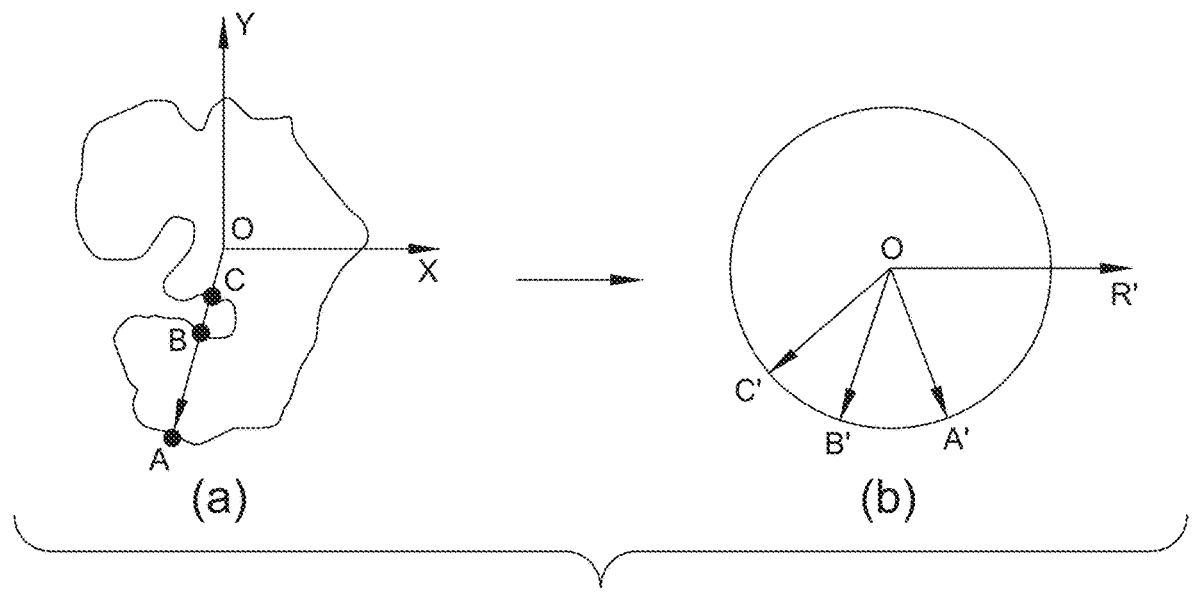
FIG. 12 shows another example of feature extraction based on the digital image.

Referring to FIG. 12, the Fourier series method may then be applied to the non-star shaped island 22. For example, the edges of the irregularly shaped island 22 shown in image (a) may be mapped to a circle with the same perimeter as shown in image (b). The position of any point on the circle can be calculated by the following Fourier series:

$$x(\varphi') = a_{x0} + \sum_{n=1}^{N} [a_{xn}\cos(n\varphi') + b_{xn}\sin(n\varphi')] \quad \text{Eq.8}$$

$$R(\varphi') = a_{y0} + \sum_{n=1}^{N} [a_{yn}\cos(n\varphi') + b_{yn}\sin(n\varphi')] \quad \text{Eq.9}$$

By solving equation 9 (for example, by the least-squares method) and finding the coefficients, the animal nose feature can be reconstructed again. Depending on the desired accuracy, the number of coordinates (M) and coefficients (N) may be changed. The gradient direction at any point on the edge of the irregularly shaped island 22 can be derived from the following equation:

$$\theta = \arctan\left[\frac{y'(\varphi')}{x'(\varphi')}\right] \quad \text{Eq.7}$$

By integrating the absolute value of the change rate of θ with respect to φ', the following equation for the angularity index (AI) can be derived:

$$AI_g = \frac{1}{2\pi}\int_0^{2\pi} \left|\frac{d\theta}{d\varphi'}\right| d\varphi' - 1 \quad \text{Eq.8}$$

Figure 13:
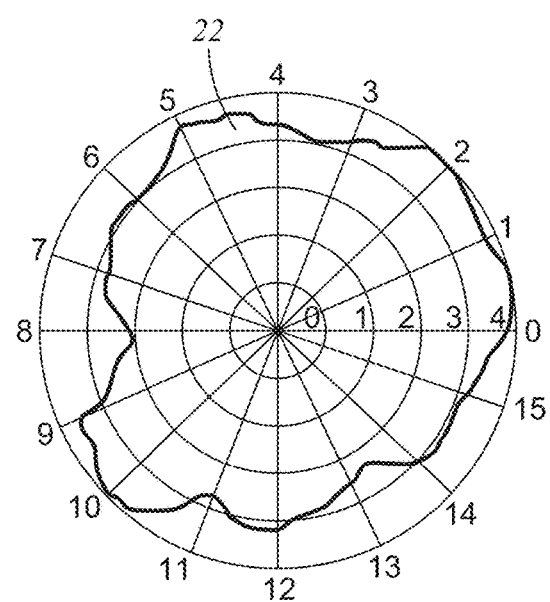
FIG. 13 shows another example of feature extraction based on the digital image.

FIG. 13 shows another example of feature extraction that may be performed by the feature extractor 140 of the animal identifying apparatus 100. In the example of FIG. 13, the one or more extracted features includes a shape matrix of one or more of the plurality of islands 22. When finding a correspondence between one irregularly shaped island 22 in a target image 10 (e.g., taken of an unknown animal) and the same irregularly shaped island 22 in one or more reference images 10 (e.g., stored in the known animal database 300), it is helpful for the extracted feature(s) to be independent of translational, rotational, and/or scaling differences in the two images 10. A shape matrix (SM) is a polar quantization of a perimeter shape. By considering a normalized coordinate system at the mass center of the shape with an x-axis from the center to the farthest point on the shape, an array of numbers may be calculated when the shape is resampled at uniform angular and radial steps that is independent of the position and orientation of the shape. In this way, if the radial increment is a function of the maximum radius of the shape, the result will be independent of the scale of the shape. The normalized space may be translated to a desired m×n array. Each element of this array may contain the value 1 or 0 indicating whether a point is inside (1) or outside (0) the perimeter. This array may be referred to as a shape matrix. In the context of the plurality of islands 22, the shape matrix may contain the information of the edges 20 as well as the interior of islands 22, with the number 1 in the shape matrix representing the island 22 and 0 representing the channel 24, for example.

The similarity S between a matrix M1 of size m×n in the target image and a matrix M2 of size m×n in the reference image(s) can be determined from the following equation, for example, where "&", "|", and "!" are logical AND, OR, and NOT operations, respectively, and S is between 1 and 0:

$$S = \sum_{i=0}^{m-1}\sum_{j=0}^{n-1} \frac{1}{mn}[(M_1[i,j] \& M_2[i,j]) | (!M_1[i,j] \& !M_2[i,j])] \quad \text{Eq.9}$$

If S=1, then the two shapes perfectly match. As S decreases, the similarity between the two shapes decrease. To increase accuracy, the matrix size could be increased, with maximum accuracy being when the size of the matrix is the size of at least one of the images 10 (target or reference) in pixels.

The one or more extracted features may also include a circularity of one or more of the plurality of islands 22. The circularity of an irregular shape is a measure of how closely the perimeter approximates a circle. In particular, a circularity index (CI) may be calculated that defines how circular an island 22 is, with a very circular shape having high circularity and a highly elliptical shape having low circularity. The circularity index (CI) may be derived as a ratio of the size of an island 22 to the size of the smallest circumscribed circle, for example. The circularity of the islands 22 may also assist in animal and breed determination and categorization as described below.

The ultimate results of extracting features characterizing the plurality of islands 22 as described above are mathematical encodings of the pebbled surface 18 of the animal's nose, including its islands 22, channels 24, and various irregular shapes, that are independent of size, scale, or position of a captured digital image 10. Chain codes or other perimeter encodings, fitted circles, polygons, distributions, and other features may be extracted that are defined relative to neighboring features and/or globally defined reference points 26 identified from landmarks such as nostrils 12, philtrum 14, or eyes 19 of the animal. Unlike in the case of a direct image-to-image comparison, such mathematical encodings may be invariant to how the user holds the camera when capturing the digital image 10, lighting conditions, resolution, etc., as long as the captured image 10 contains a reasonably clear view of the pebbled surface 18 where the features were extracted from the previously registered image 10.

Figure 14:
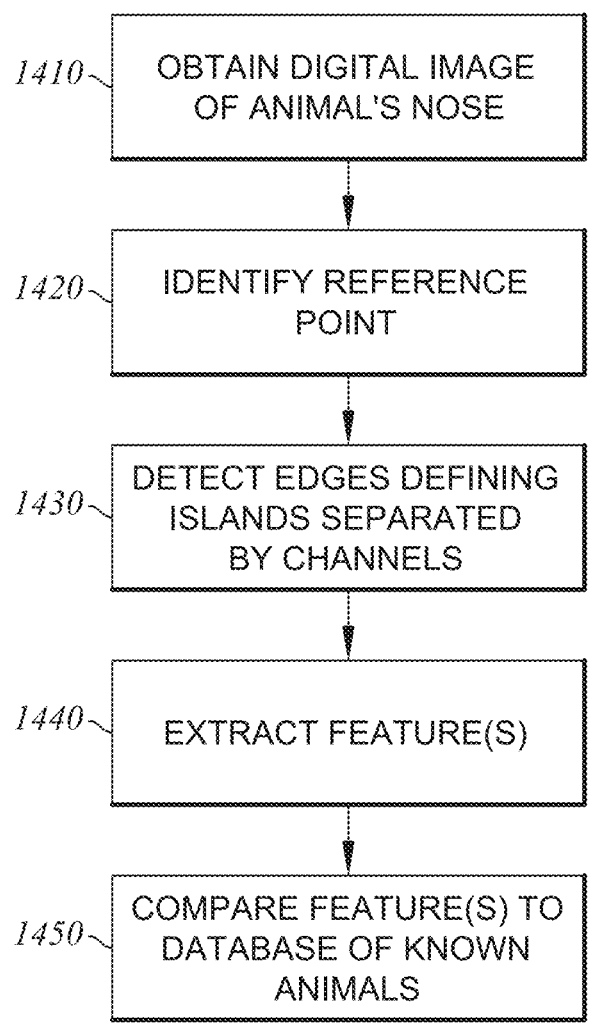
FIG. 14 shows an example operational flow of the animal identifying apparatus.

FIG. 14 shows an example operational flow of the animal identifying apparatus 100 illustrating processing steps of identifying an animal such as a lost pet. As noted above, the animal identifying apparatus 100 may comprise one or more processors some or all of which may be included in a server or combination of networked servers remote from the mobile device 200, which may be on a local network or accessible over the Internet (e.g., a cloud network) by wired or wireless connection. Accordingly, the steps of FIG. 14 may be performed in whole or in part by one or more servers remote from the mobile device 200, for example. The operational flow may begin with obtaining a digital image 10 of an animal's nose (step 1410) and, in some cases, performing various preprocessing steps on the image 10 such as scale adjustment, noise removal, segmentation, enhancement, etc. For example, the I/O interface 110 of the animal identifying apparatus 100 may obtain a captured image from the mobile device 200 by communicating with a web browser or mobile application installed on the mobile device 200.

The operational flow may continue with identifying one or more reference points 26 in the digital image 10 (step 1420), which may be based on landmarks such as nostrils 12, philtrum 14, eyes 19, etc. of the animal as described above, as well as detecting a plurality of edges 20 in the digital image 10 (step 1430), where the edges 20 define a plurality of islands 22 separated by recessed channels 24 characteristic of the noses of dogs and certain other animals. With the reference point(s) 26 and edges 20 having been derived from the image 10 (e.g. by the reference point identifier 130 and edge detector 120, respectively), the operational flow may proceed with feature extraction according to one or more methodologies as exemplified by the processes described above in relation to FIGS. 5-13 (step 1440). In particular, the feature extractor 140 of the animal identifying apparatus 100 may extract one or more features characterizing the plurality of islands 22 in relation to the reference point(s) 26, the features including, for example, a size distribution of the islands 22, a map of the islands 22 or surrounding channels 24, and/or any of various approximate or pixel-accurate characterization of individual islands' perimeters or shapes as described throughout this disclosure. The extracted feature(s) may then be compared by the matching engine 150 to the known animal database 300 (step 1450) in order to find a match from among pre-registered animals. In this way, the operational flow of FIG. 14 may identify the animal in the digital image 10 using extracted features characterizing the pebbled surface 18 of the animal's nose, without needing to resort to an image-to-image comparison that may be more computing resource intensive and more dependent on the particularities of the captured image 10.

Figure 15:
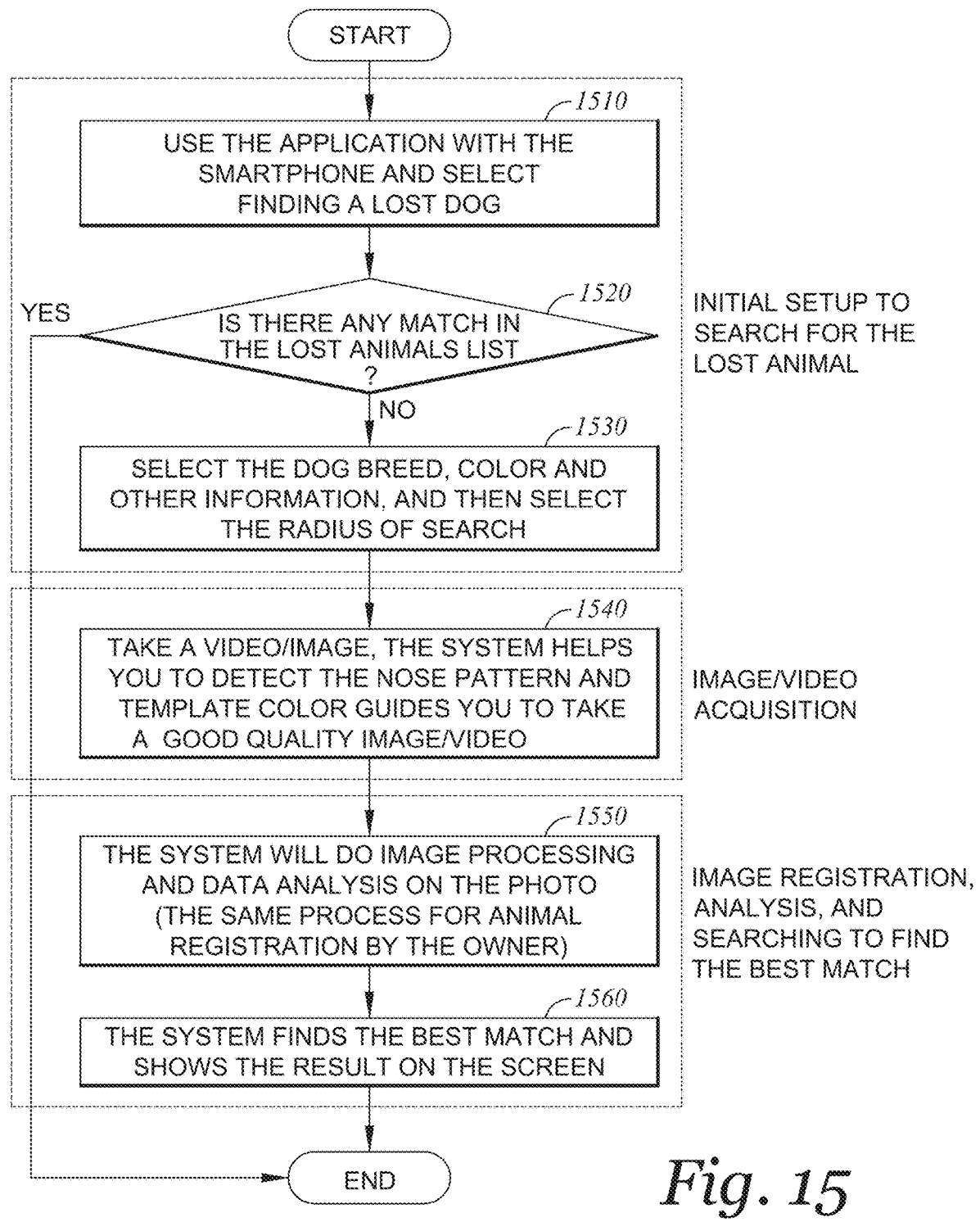
FIG. 15 shows another example operational flow of the animal identifying apparatus in relation to finding a lost dog.

FIG. 15 shows another example operational flow of the animal identifying apparatus 100, highlighting additional steps that may be implemented when the animal identifying apparatus 100 is used to find a lost pet such as a dog. In FIG. 15, it is supposed by way of example that the finder of a lost dog has installed an application such as a downloadable mobile application associated with the animal identifying apparatus 100 on a mobile device 200 (see FIG. 1) such as a smartphone. As such, the operational flow may begin with running the application on the smartphone and selecting a function such as "finding a lost dog" (step 1510), for example, by tapping an appropriate user interface element on a touchscreen of the smartphone 200. As an initial measure taken to identify the lost dog, the application may first assist the user with determining whether the dog appears on a lost animals list (step 1520), which may include a local listing of dogs with photographs and names. For example, the application may display a lost animals list to the user, who may then browse the list to see if the animal matches one of the animals on the list. The application may allow the user to filter the lost animals list by inputting dog breed, color, size, or other basic information. If the dog is identified in this way (step 1520: YES), the operational flow of FIG. 15 may end. If, however, no match is found using public listings of lost animals (step 1520: NO), the operational flow may continue with inputting additional information as part of the initial setup to search for the lost animal using the animal identifying apparatus 100 (step 1530). In this regard, the application may prompt the user to select a dog breed, color, size, radius of search, or other information to be used when attempting to find the dog in the known animal database 300 (see FIG. 1). The entered information may be similar to or the same as the information used to filter the lost animals list for easy browsing in step 1520, but the information will now be used for narrowing the database 300 during a matching process based on extracted features as described throughout this disclosure.

The operational flow may continue with an image or video acquisition process in which the user of the smartphone 200 takes an image or video of the dog's nose using a camera of the smartphone 200 (step 1540). For example, the software may help users to take pre-qualified images by offering color-coded template overlays and other indicators on the display of the smartphone 200. An example of such a template overlay or indicator may be a large circle similar to the large circle shown in FIG. 4. The circle may indicate where a properly positioned and sized nose should appear in order to contain all or almost all of the region where the pebbled surface 18 exists. In some cases, the template overlay may change depending on the live image being captured by the camera of the smartphone 200. For example, the template overlay may be red initially and may change to green to indicate when to take proper video or still images of the nose. The animal identifying apparatus 100 may, for example, analyze the live image and detect animal nostrils 12, philtrum 14, eyes 19, and/or nose texture to determine when the camera is properly aligned with the animal's nose. Alternatively, instead of indicating to the user when to capture video or images, the software can automatically extract nose images from the live video stream when the camera is determined to be lined up appropriately with the animal's nose. In addition to these nose images, which may serve as the captured digital image 10 from which features will be extracted as described throughout this disclosure, the application may additionally assist the user with capturing other images of the animal, such as a full side silhouette and/or full face image. These additional images (as well as the nose image) may be used to assist in breed determination, for example, in order to narrow the database 300 during the matching process.

Along these lines, the process of comparing features to identify the animal may be made faster if different animals and even different breeds are categorized based on their nose shape and the structure of the pebbled surface 18 of the nose. Different parameters like circularity and angularity of each island 22 on the pebbled surface 18 of the animal's nose (or averages thereof) can be defined. For example, the islands of the pebbled surface 18 of the noses of most dog breeds exhibit high circularity and high angularity, while a deer's nose may typically exhibit high circularity and low angularity (e.g., rounded circular islands 22). A cow's nose typically has low circularity, with some breeds having low angularity and others having high angularity. By categorizing different animals and breeds by their circularity, angularity, and other common features, and/or training a machine learning model with known data of this type, the animal identifying apparatus 100 may be able to first recognize a broad class of animals that the image 10 likely belongs to when identifying an unknown animal from the digital image 10. The matching engine 150 may then, for example, narrow the database 300 while looking for a match.

As noted above, the captured digital image 10 may be pre-qualified through the use of template overlays and other indicators. Along the same lines, it is contemplated that the animal identifying apparatus 100 may pre-qualify the image 10 at any stage of the process up to and including feature extraction. For example, if pre-processing (e.g. de-noising, etc.) of the image 10 yields insufficient results, if the output of the edge detector 120 or reference point identifier 130 is insufficient, or if the extracted feature(s) 140 are determined to fall outside of some predefined thresholds (e.g., if they do not match the breed determined by other images of the animal), the animal identifying apparatus 100 may prompt the user of the mobile device 200 to capture another image, such as an image under different lighting conditions. In some cases, this kind of pre-qualification may also be performed automatically based on a single live image stream, with the user possibly being prompted to move the camera or adjust the lighting, etc. For example, a simpler pre-qualification may be performed locally by a processor of the mobile device 200 while a more involved pre-qualification may typically be performed by a processor of a remote server in communication with the mobile device 200 via the mobile application.

With an appropriate digital image 10 having been acquired, the operational flow of FIG. 15 may continue with image processing and data analysis including feature extraction as described throughout this disclosure (step 1550). It should be noted that the image/video acquisition and analysis steps 1540 and 1550, while described in relation to a user who is trying to identify a lost dog, may be the same for a user who is registering her own dog with the animal identifying apparatus 100. Additional details of the registration process are described below.

Lastly, the animal identifying apparatus 100 may find the best match or a set of likely matches by comparing the extracted features to the known animal database 300 (step 1560). The matching process may depend on the particular features used by the animal identifying apparatus 100. Examples of matching subprocesses may include point pattern matching, line matching, region matching (e.g. relaxation labeling or Chamfer matching), template matching, etc. as well as the use of shape matrix (SM) points, for example. In some cases, the animal identifying apparatus 100 may extract a plurality of features of different accuracies. For example, as a first pass, the matching engine 150 may look for animals in the database 300 having the same size distribution of islands 22 relative to a shared reference point 26 (see FIG. 8). If there are multiple matches (or if there are a number of matches exceeding a predetermined number), the matching engine 150 may then compare a more distinguishing feature as a second pass, such as a map of inscribed or circumscribed circles or channels (see FIGS. 7 and 9). If there are still too many hits, the matching engine 150 may further compare the specific perimeters and shape characteristics (e.g., angularity) of individual islands 22 (see, e.g., FIGS. 5, 6, and 10-13). Additional passes may include, for example, comparisons under appropriate scaling, transformation and rotation. In this way, the matching process can be made efficient and a match or set of matches may be found with a desired degree of confidence in light of available processing resources. As noted above, the efficiency of the matching process may also be increased by limiting the known animal database 300 according to breed, color, radius of search, or other information provided by the user (in some cases based on additional captured images of the animal). The animal identifying apparatus 100 may display the result(s) on the screen of the user's mobile device 200 via the user interface of the mobile application so that the user can initiate a communication with the owner of the pet. In some cases, the animal identifying apparatus 100 may automatically notify the owner of the pet when a match is found.

Figure 16:
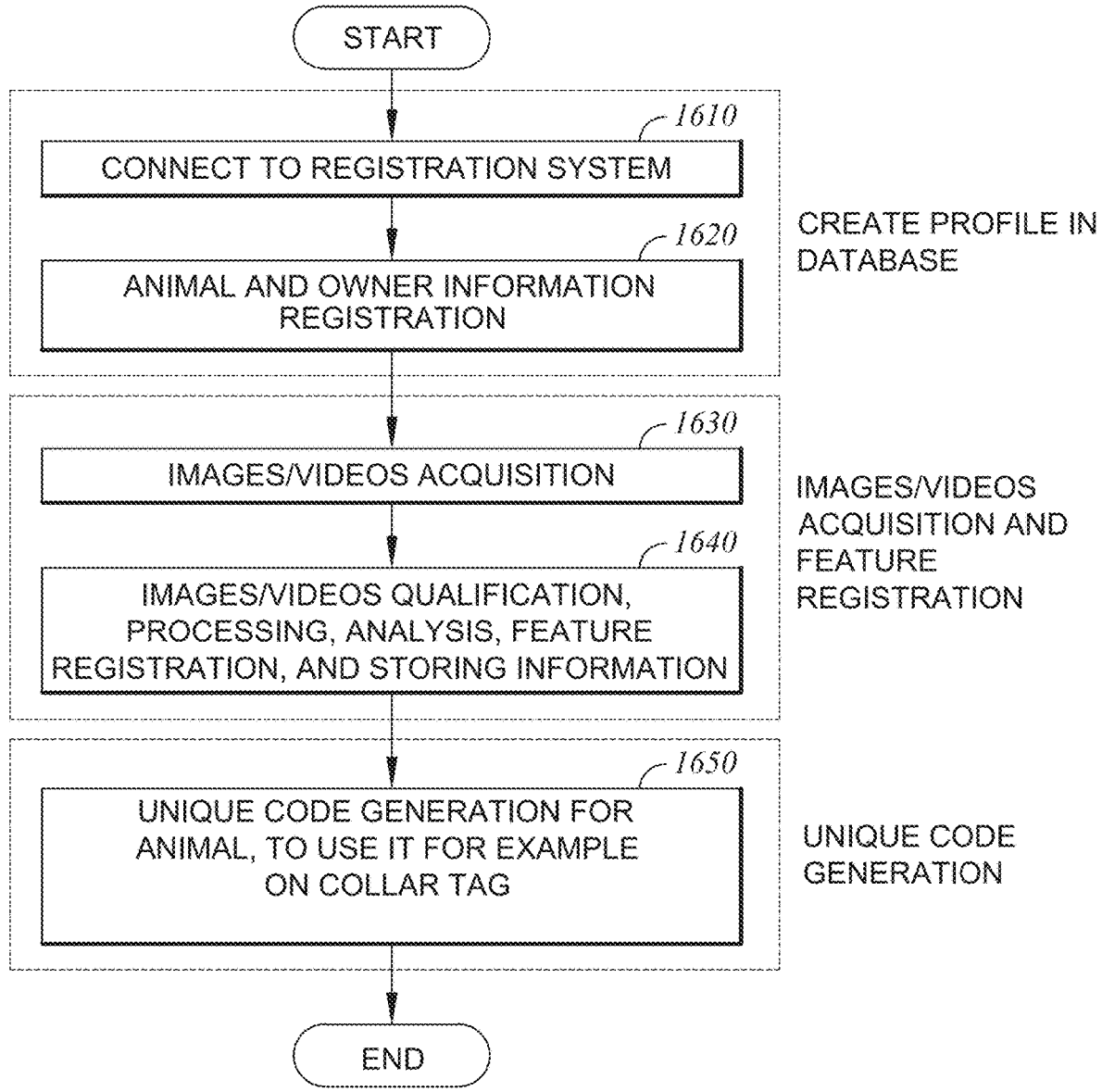
FIG. 16 shows another example operational flow of the animal identifying apparatus in relation to registering a known animal.

FIG. 16 shows an example operational flow of the animal identifying apparatus 100 in relation to registering a known animal. The operational flow of FIG. 16 may be used to populate the known animal database 300 of FIG. 1, for example, which may thereafter be used to identify a lost animal as described above. By storing animal and owner information, a community of interested people can connect an animal to an owner. The operational flow may begin with the creation of a profile in the known animal database 300, including connection to a registration system of the animal identifying apparatus 100 (1610) and registration of animal and owner information (step 1620). For example, the animal identifying apparatus 100 may generate a user interface via a mobile application or website accessible to the registering user on a computing device such as the mobile device 200. By selecting a "registration" function, for example, the user may be prompted to enter various identifying information of the owner and the animal, contact information, security credentials, etc. to be associated with the new profile, which may then be obtained by the I/O interface 110 and stored in the known animal database 300. Owner information to be entered may include, for example, full name, phone, email, address, social media accounts like Facebook, Instagram, LinkedIn, or Twitter, etc. Animal information to be entered may include, for example, name, sex, breed(s), age, size, and color(s), as well as some photos or videos. The owner may take some photos based on templates shown in the registration system to help approximate a breed or type, and other characteristics. The owner may also add some information for the animal which is unique. For example, in the case of a dog, an owner might add something like medical or other needs, a favorite reward, a favorite place to rest, things the dog tends to bark at, etc.

The operational flow may then proceed with acquisition of images and/or videos (step 1630) and feature extraction and registration (step 1640). These steps may be the same as steps 1540 and 1550 of FIG. 15 and may include pre-qualification, pre-processing, reference point identification, edge detection, and feature extraction as discussed above, including assistance to the registering user in capturing satisfactory images or videos through the use of template overlays and other indicators, etc. It is noted that the requirements of the captured image(s) 10 and extracted features may be especially stringent during the registration process, as it will not be possible to capture additional images once the animal is lost and requires identification. The extracted features may then be stored in the known animal database 300 in association with the newly registered profile.

As a final step of the registration process, it is contemplated that a unique code may be generated for the animal (step 1650), such as an alphanumeric code that may be used to generate a QR code or other barcode to identify the animal. The code may be stored in the known animal database 300 in association with the animal and also printed, engraved, or embossed on a collar tag to be worn by the animal. The collar tag may be used for easy identification of the lost animal in a case where the dog is lost while wearing the collar tag. By scanning the code with application software associated with the animal identifying apparatus 100, a user may be able to access the animal's public profile.

It is envisioned, for example, that the digital image 10 used for extracting features during registration may also be used to generate the collar tag. For example, after registration of the animal, a skeletonized pattern of the pebbled surface 18 of the nose taken from the digital image 10 may be used to generate a 2D or 3D collar tag, which may be sent to the owner of the pet. The collar tag may be any shape (e.g., dog nose-shaped) and may be made of plastic, steel, or green or renewable materials such as wood. On the back of the collar tag there may be information such as the unique barcode, the name of the smartphone app or other application or website that reads the barcode and connects to the company's services, and the animal's name. To create a 3D collar tag of the animal nose, 3D printer technology may be used. By selecting the appropriate size and type of nose based on the animal type, breed, etc., a 3D printer can create an approximation of the nose features. To create a 2D collar tag a skeletonized image approximating the nose features may be etched onto the tag with a laser. Both 3D and 2D collar tags may include the barcode and smartphone app information. Such a collar tag may have many benefits for the community of users of the animal identifying apparatus 100. First, it shows that the animal is registered in the community. Second, anyone who finds the animal and does not know anything about the community can get the information from the back of the tag and could find the owner. Last but not least, it is a reminder that the owner can order more to use on keychains and necklaces, as conversation pieces, as a keepsake for a pet that has passed away, etc.

Figure 17:
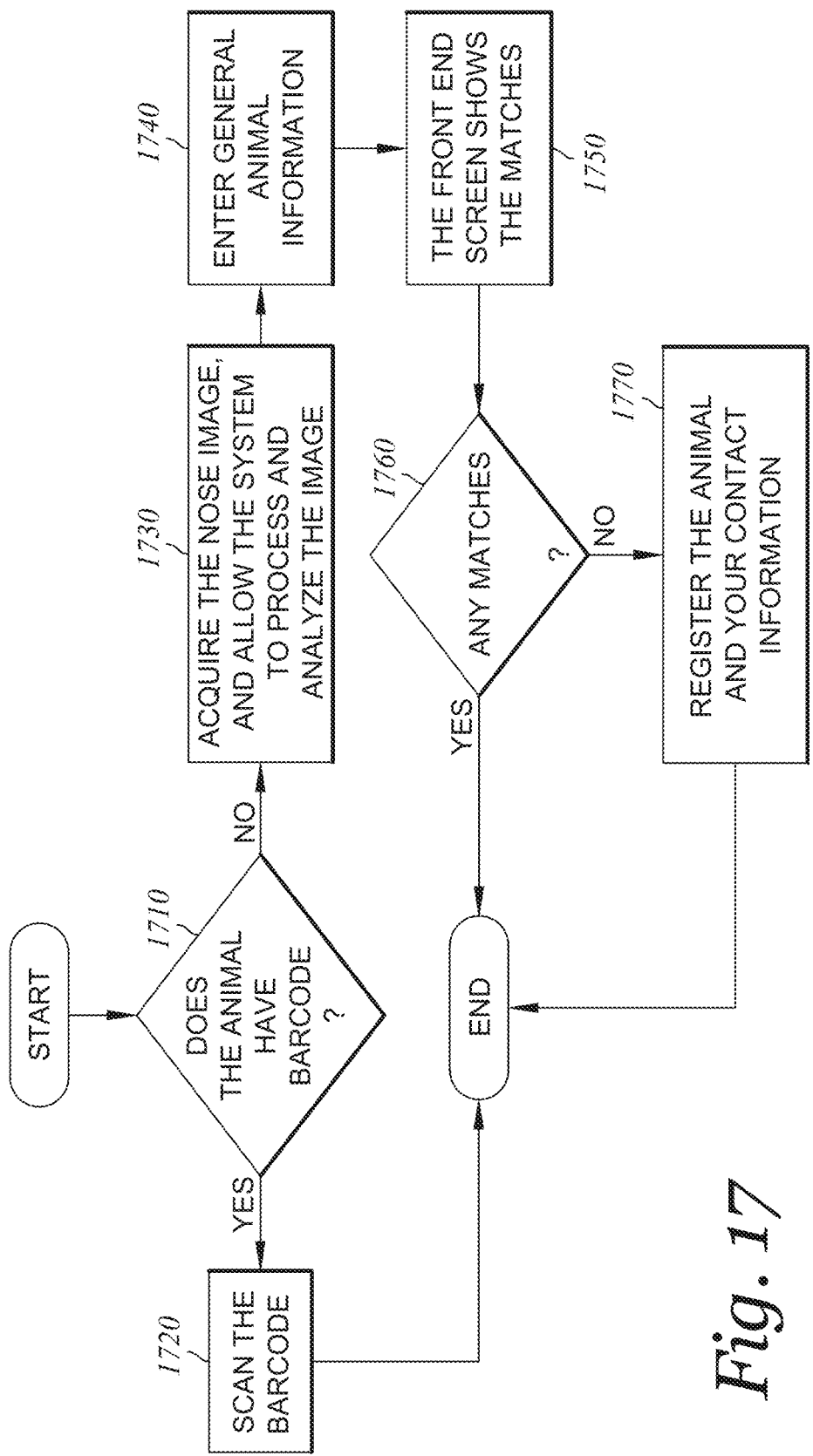
FIG. 17 shows another example operational flow of the animal identifying apparatus.

FIG. 17 shows another example operational flow of the animal identifying apparatus 100 illustrating a process of identifying a lost animal that may or may not have a collar tag with an identifying barcode. In a case where the animal has a barcode (step 1710: YES), the user may simply scan the barcode (step 1720) using a mobile application associated with the animal identifying apparatus 100. The scan data may be communicated to a server, which may then simply match the unique identifier of the barcode with the profile of the animal in the known animal database 300 and provide the user with the result and/or contact the owner. If, on the other hand, the animal does not have a barcode or if the barcode is not visible due to deterioration of a collar tag, for example (step 1710: NO), the user may acquire a digital image 10 as described above (step 1730) and enter general animal information as prompted by the application (step 1740). The animal identifying apparatus 100 may then process and analyze the digital image 10, using one or more extracted features and/or the entered information to identify one or more matches found in the known animal database 300. Any matches may be presented to the user on a front-end screen of the mobile application (step 1750). If there are one or more matches (step 1760: YES), the animal identifying apparatus 100 may provide the user with the result and/or contact the owner. For example, the user may be presented with a message such as, "Congratulations! The most similar registered animal in the system is this one. Now you can post here that you found the animal," with an accompanying link for creating a post. On the other hand, if there are no matches (step 1760: NO), it is contemplated that the mobile application may prompt the user to register the found animal and her own contact information (step 1770), which may be used to generate a public listing of found and unidentified animals, for instance. The user might be presented with a message such as, "Sorry, no match was found. This animal is not registered in the system yet. Please bring the animal to the following shelters," with information about the nearest shelters. Information about the found animal may be posted in the community.

FIG. 18 shows a side view of an example image acquisition device 1800 that may be used with the animal identifying apparatus 100. The image acquisition device 1800 may include a hanger 1810 that attaches to a smartphone or other mobile device 200, a light disc 1820 that connects to the hanger 1810 and provides lighting, and a cone 1840 that extends outward from the light disc 1820 to surround an animal's nose. FIG. 19A shows a front view of the hanger 1810 attached to the mobile device 200 near a camera 210 of the mobile device 200. As shown, the hanger 1810 may surround the camera 210 without obstructing it in order to allow an image to be taken through the image acquisition device 1800. FIG. 19B shows a front view of the hanger 1810 and the light disc 1820. FIG. 19C shows a front view of the assembled image acquisition device 1800 including the hanger 1810, the light disc 1820, and the cone 1840. As shown in FIG. 18, the cone 1840 may attach to the muzzle of the animal using a harness with straps, for example. The image acquisition device 1800 may be an adjustable device that consists of these several separate parts that can be connected to each other for different applications and even can be attached to the animal to get a good quality photo of the nose features. The image acquisition device 1800 may be used to improve the photo or video quality when capturing a high-quality digital image 10 for image processing and analysis as described herein, especially in the case of an animal that moves around during photo acquisition.

The hanger 1810 may be adjustable for different sizes of smartphones 200 or other personal electronics. Supported by the hanger 1810, the light disc 1820 may include one or more lights such as the ring of lights shown surrounding the camera 210 of the smartphone 200. Depending on the location of the camera 210 on the back of the smartphone 200, the light disc 1820 containing the lights can be translated along the hanger 1810 to different positions. To provide power for the lights, a wire 1830 may be connected to the smartphone 200 as shown in FIG. 18. Alternatively, the light disc 1820 may use rechargeable or replaceable batteries. The lights may help produce a higher quality image 10 which may be more likely to meet any pre-qualification criteria applied by the animal identifying apparatus 100. The cone 1840, which may be connected to the hangar 1810 or the light disc 1820, may serve to direct the light and the camera 210 toward the animal's nose. There may be some holes on the cone as shown to allow the animal to breathe easily while the cone 1840 is attached to the animal's nose.

The parts of the image acquisition device 1800 may be separate, such that the image acquisition device 1800 may be used with or without all of it is parts. For example, the user may choose to use the light disc 1820 and hanger 1810 without the cone 1840, or the user may additionally use the cone 1840 but just hold it near the animal without attaching it to the animal's head.

As an alternative, the light disc 1820, could include a camera. In this case, the smartphone 200 or other personal electronics may be replaced, in whole or in part, with a small embedded computer module that controls the camera and lights and acquires an image or video.

As noted above, the animal identifying apparatus 100 may comprise one or more processors, some or all of which may be included in a mobile device 200 such as a smart phone, tablet, or personal computer and some or all of which may be included in a server or combination of networked servers remote from the mobile device 200. In this regard, the functionality described in relation to the components of the animal identifying apparatus 100 shown in FIG. 1 and the various operational flows described in relation to FIGS. 14-17 may be wholly or partly embodied in a computer including a processor (e.g., a CPU), a system memory (e.g., RAM), and a hard drive or other secondary storage device. The processor may execute one or more computer programs, which may be tangibly embodied along with an operating system in a computer-readable medium, e.g., the secondary storage device. The operating system and computer programs may be loaded from the secondary storage device into the system memory to be executed by the processor. The computer may further include a network interface for network communication between the computer and external devices (e.g., over the Internet), such as the mobile device 200 accessing the various user interfaces described throughout this disclosure via a mobile application or web browser.

The computer programs may comprise program instructions which, when executed by the processor, cause the processor to perform operations in accordance with the various embodiments of the present disclosure. The computer programs may be provided to the secondary storage by or otherwise reside on an external computer-readable medium such as a DVD-ROM, an optical recording medium such as a CD or Blu-ray Disk, a magneto-optic recording medium such as an MO, a semiconductor memory such as an IC card, a tape medium, a mechanically encoded medium such as a punch card, etc. Other examples of computer-readable media that may store programs in relation to the disclosed embodiments include a RAM or hard disk in a server system connected to a communication network such as a dedicated network or the Internet, with the program being provided to the computer via the network. Such program storage media may, in some embodiments, be non-transitory, thus excluding transitory signals per se, such as radio waves or other electromagnetic waves. Examples of program instructions stored on a computer-readable medium may include, in addition to code executable by a processor, state information for execution by programmable circuitry such as a field-programmable gate arrays (FPGA) or programmable logic array (PLA).

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A method of identifying an animal, the method comprising:
   obtaining a digital image of at least a portion of the animal's nose;
   identifying a reference point in the digital image from one or more landmarks in the digital image;
   detecting a plurality of edges in the digital image, the plurality of edges defining a plurality of islands separated by recessed channels;
   extracting, from the digital image, one or more features characterizing the plurality of islands in relation to the reference point and including a size distribution of the plurality of islands, the size distribution comprises a distribution of sizes of inscribed or circumscribed circles of the plurality of islands; and
   comparing the one or more features to a database of extracted features stored in association with known animals to identify the animal.

2. The method of claim 1, wherein the one or more features further includes a map of inscribed or circumscribed circles of the plurality of islands.

3. The method of claim 1, wherein the one or more features further includes a map of the channels.

4. The method of claim 1, wherein the one or more features further includes a chain code characterizing a perimeter of one or more of the plurality of islands.

5. The method of claim 4, further comprising applying a mask to the digital image based on the chain code, wherein the one or more features further includes at least one feature extracted from the digital image with the mask applied thereto.

6. The method of claim 1, wherein the one or more features further includes a polygon approximating one or more of the plurality of islands.

7. The method of claim 1, wherein the one or more features further includes an angularity of one or more of the plurality of islands.

8. The method of claim 1, wherein the one or more features further includes a circularity of one or more of the plurality of the islands.

9. The method of claim 1, wherein the one or more features further includes a shape matrix of one or more of the plurality of islands.

10. The method of claim 1, wherein the one or more landmarks include a nostril of the animal's nose.

11. The method of claim 1, wherein the one or more landmarks include a philtrum of the animal's nose.

12. The method of claim 1, wherein the one or more landmarks includes an eye of the animal.

13. The method of claim 1, wherein the one or more landmarks includes a collection of the plurality of islands.

14. The method of claim 1, wherein said obtaining the digital image includes selecting an image from a sequence of captured video frames.

15. A non-transitory computer readable medium on which are stored instructions executable by a processor or programmable circuit to perform operations for identifying an animal, the operations comprising:
- obtaining a digital image of at least a portion of the animal's nose;
- identifying a reference point in the digital image from one or more landmarks in the digital image;
- detecting a plurality of edges in the digital image, the plurality of edges defining a plurality of islands separated by recessed channels;
- extracting, from the digital image, one or more features characterizing the plurality of islands in relation to the reference point and including a size distribution of the plurality of islands, the size distribution comprises a distribution of sizes of inscribed or circumscribed circles of the plurality of islands; and
- comparing the one or more features to a database of extracted features stored in association with known animals to identify the animal.

16. A system for identifying an animal, the system comprising:
- a camera for capturing a digital image of at least a portion of the animal's nose;
- one or more processors collectively to identify a reference point in the digital image from one or more landmarks in the digital image, detect a plurality of edges in the digital image, the plurality of edges defining a plurality of islands separated by recessed channels, and extract, from the digital image, one or more features characterizing the plurality of islands in relation to the reference point and including a size distribution of the plurality of islands, the size distribution comprises a distribution of sizes of inscribed or circumscribed circles of the plurality of islands; and
- a database of extracted features stored in association with known animals;
- wherein the one or more processors is collectively to compare the one or more features to the database to identify the animal.

17. The system of claim 16, further comprising a mobile device including the camera.

18. The system of claim 17, wherein the one or more processors includes a processor of the mobile device that is to display an overlay on a display of the mobile device while the digital image is being captured by the camera, the overlay including one or more indicators for aligning the camera with the animal's nose.

19. The system of claim 17, wherein the one or more processors includes a processor of the mobile device that is to select the digital image from a sequence of video frames captured by the camera.

20. The system of claim 17, further comprising a server in communication with the mobile device, wherein the one or more processors includes a processor of the server that compares the one or more features to the database to identify the animal.

* * * * *